United States Patent [19]
Shea

[11] Patent Number: 5,788,502
[45] Date of Patent: Aug. 4, 1998

[54] METHOD OF LANGUAGE INSTRUCTION AND FACT RECOGNITION

[76] Inventor: James W. Shea, 7614 York Ave. South, Edina, Minn. 55435

[21] Appl. No.: 762,047

[22] Filed: Dec. 9, 1996

[51] Int. Cl.$^6$ .................................................. G09B 19/00
[52] U.S. Cl. ...................................... 434/157; 434/172
[58] Field of Search ................................ 434/167, 170, 434/172, 176, 156, 157, 184; 273/296, 302, 299

[56] References Cited

U.S. PATENT DOCUMENTS

| | | | |
|---|---|---|---|
| 3,271,884 | 9/1966 | Roberson | 434/157 |
| 3,618,231 | 11/1971 | Nason | 434/167 |
| 4,234,189 | 11/1980 | Chunn | 434/172 |
| 4,262,431 | 4/1981 | Darnell | 434/172 |
| 4,419,080 | 12/1983 | Erwin | 434/172 |
| 4,470,821 | 9/1984 | LaCapelain | 434/172 |
| 4,671,516 | 6/1987 | Lizzola et al. | 434/172 |
| 4,878,844 | 11/1989 | Gasper et al. | 434/167 |
| 5,492,473 | 2/1996 | Shea | 434/157 |

*Primary Examiner*—Paul J. Hirsch

[57] ABSTRACT

A language instruction and fact recognition method for teaching as well as self instruction of a language, primary or secondary, increasing vocabulary of a language and providing a fact recognition basis with self learning and self checking techniques. Using as part of the method, a master chart provided with an arrangement of a single word, words or graphical representations, the method includes a plurality of cards each having primary or secondary indicia accompanied by a word, words or graphical representations corresponding to the master chart on a first side with the method including a card orientation and placement device for retaining the cards in a manner to present the first side of a card to the second side of another card. In the method the student turns the cards studying the pairs in their relation one to the other until satisfied that the meanings and relationships of all cards is clearly understood. In the testing phase of the method the student places the cards numbered side down except for the lowest numbered card which is placed numbered side up at the front of the other cards. The method includes the task of the student to select the card from the board that correctly matches the numbered card showing and in keeping with the numbered sequence and continuing until the exercise is completed. The method is also applicable for CD ROM usage.

6 Claims, 2 Drawing Sheets

METHOD OF LANGUAGE INSTRUCTION AND FACT RECOGNITION

SPONSORSHIP

This invention has not been made under any Federal or Independent sponsorship and is the sole work of the Applicant.

RELATED APPLICATIONS

There are no pending applications on file by Applicant and Applicant has no knowledge as to any applications which should be considered in association with the prosecution of this application.

FIELD OF THE INVENTION

This invention is an ordered and phased method of learning, i.e. learn, study, test and correct, and relates generally to language instruction and fact recognition and the method employed provides for interaction between words of a first language for functional illiterates and beginning readers and also to correlating primary and secondary languages and more specifically to the method employed by which language and recognition skills are taught or self taught and improved using a master chart or master cards and a plurality of specifically marked and denoted cards. One side of each card is provided with primary and secondary indicia; the other side does not include such indicia but with both sides of the cards are provided with source and correlated graphics or related words.

SHORT SUMMARY OF THE INVENTION

The method of teaching or improving various language skills of a person either in a primary language or in and for relation of a primary to a secondary language.

The method includes the use of a Master Reference Chart or at least one set of Master Reference Cards.

The Master Reference Chart or Master Reference Cards consist of single words, numbers of words, words arranged in phrases, word phrases requiring completion, symbols, pictures of articles, etc.

When teaching functional illiterates or beginning readers, only primary language words, phrases, etc. are utilized while when teaching a secondary language both primary language and secondary language words phrases, etc. are included.

The Master Reference Chart or Master Reference Cards are provided with a first word, symbol, partially completed sentence or the like and a category indicia marking and a sequential marking as well as an answer, synonym, definition, name, etc. The student studies the Master Reference Chart or Master Reference Cards until he or she knows the relationship between the first element or query and the answer.

A second set of Cards includes a Starting Card with a query such as a word, phrase, symbol, etc. category indicia and sequential marking on one side thereof. Answer cards are provided with a front side having only the category indicia and a possible answer or related word to the first such card and a new query in the form of a word, phrase, symbol, etc. on the obverse thereof.

The Answer Cards are placed on a surface with only the front side showing. The student then selects what he or she thinks is the appropriate Answer Card and places it front side down on the Starting or Query Card. If he or she has selected the right Answer Card, the sequential markings will be in proper sequence and the obverse side will show a new word, phrase, symbol or the like to be matched to those Answer Cards remaining with only their front sides showing.

The self taught aspect is achieved by the student knowing that sequential properness and progress are all right answers.

When applied to second language teaching the Master Reference Chart or Master Reference Cards would contain both primary and secondary languages and, for example, if an article were illustrated, the primary language word would appear above the article with the secondary language appearing below, while with synonym usage or sentence completion, both primary and secondary words would appear.

The use and testing cards would again begin with a Starting Query Card having a primary language word, article etc., category indicia and sequential marking and the remainder of the cards, being Answer Cards would have only the category marking and a possible second language synonym on the front side thereof and a primary language new word and category-indicia and sequential marking on the obverse thereof.

The student would select from the possible synonyms, etc. showing on the Answer Cards and would place the same face-to-face against the Starting Card. If the sequential marking is proper, he or she has selected the right Answer Card and a new primary language word, etc. will be shown by exposing the obverse side of the card.

Obviously, for complete learning, a plurality of Master Reference Charts and Master Reference Card sets as well as a plurality of use and testing card sets including Starting and Answer Cards sets would be provided.

The method is equally applicable to CD-ROM usage as will be described in the specification.

BACKGROUND AND OBJECTS OF THE INVENTION

Various card systems for teaching have been utilized, the most common probably being phonics and mathematics cards. Typically, these are nothing more than "flash cards" with learning being no more than repetition and such cards giving no opportunity to the student to use the same for self-instruction. Such is not the condition nor situation with the Applicant's method of Instruction and Fact Recognition which incorporates first, a Master Reference arrangement and second, a method by which a student will know if he or she has properly answered a first query that is presented by a first or starting card and thereafter sequentially followed.

It is therefore an object of the applicant's invention to provide a method of language instruction and fact recognition which includes the step of providing a master reference chart which includes a word, words, phrases, sentence completion units, pictures of articles and answer or response words for initial study by a student.

It is a further object of the applicant's invention to provide a method of language instruction and fact recognition which includes the step of providing a plurality of reference cards which includes a word, words, phrases, sentence completion units, pictures of articles and answer or response words for initial study by a student.

It is a further object of the applicant's invention to provide a method of language instruction and fact recognition which includes the step of providing a plurality of testing and use cards which include a starting card having a word, words, phrase, sentence completion unit, picture of an article, category indicia and sequential masking on one side thereof and testing and use cards which include an answer or response word and category indicia on one side thereof and a new word, words, phrase, sentence completion unit, picture of an article category marking and sequential marking on the obverse side thereof.

It is still a further object of the applicant's invention to provide a method of language instruction and fact recognition to provide a plurality of correlative cards, each of which includes language characteristics or pictured articles, all of which relate to each other and which are selectible by the student user for obtaining the correlation therebetween with knowledge or proper correlation being obtained through sequential markings of the card.

These and other objects and advantages of the applicant's invention will more full appear from the accompanying drawings and disclosure.

It should be stated with regard to the drawings that they are merely illustrative of categories and the word, words, pictures of articles and sentence completions could and would, in actual usage, be expanded but this would be impossible to illustrate and unnecessary for the purposes of this application and the following description of the method.

Description of a Preferred Form of the Invention

In accordance with the accompanying drawings, FIGS. 1, 2, 3 and 4 represent either portions of complete Master Reference Charts or Master Reference Cards and similarly, Query or Question Cards and Answer Cards.

Figures 3, 4:
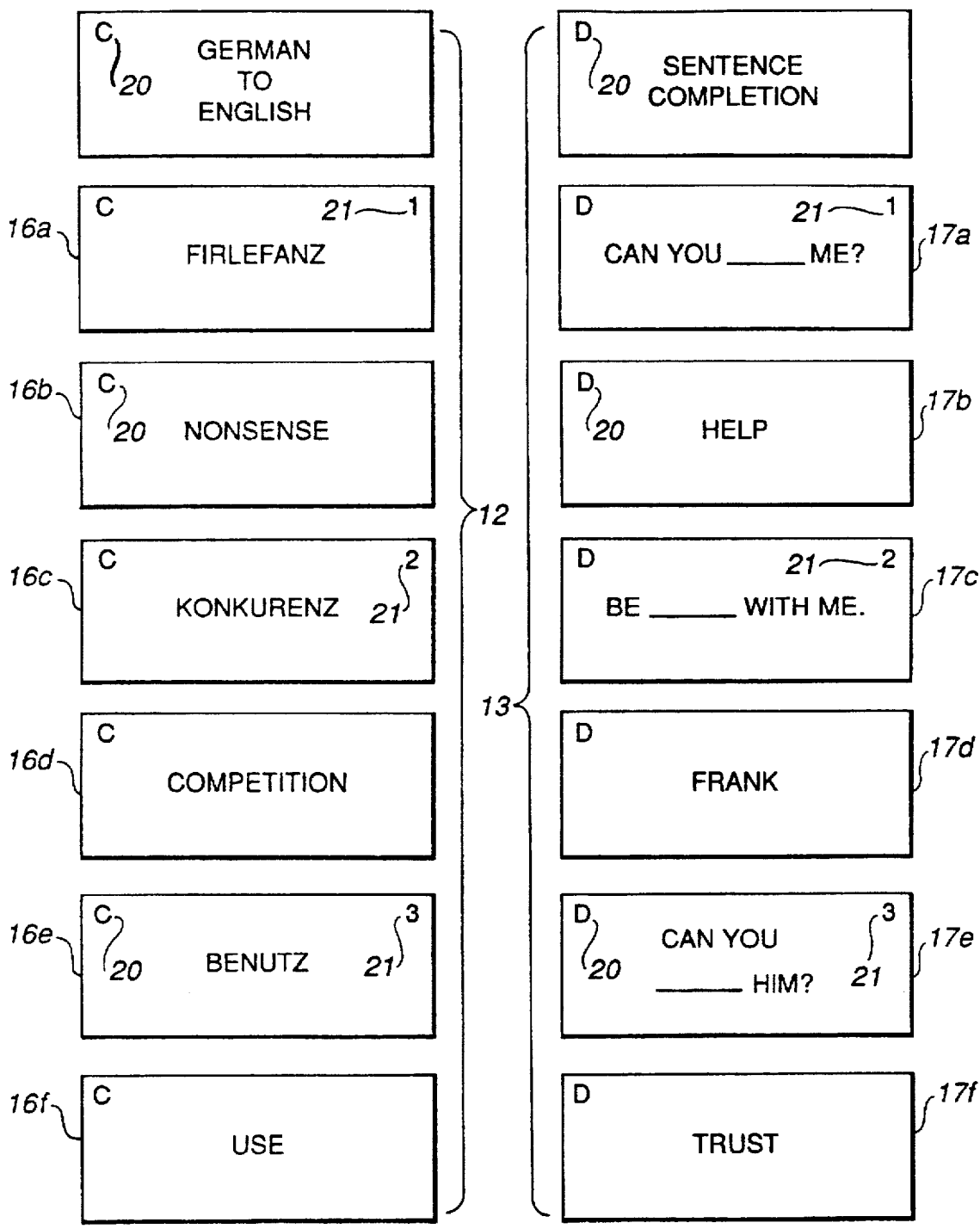
FIG. 3 is an illustration similar to FIG. 1 wherein the reference material depicts a primary to secondary language utilization.
FIG. 4 is an illustration similar to FIG. 1 wherein the reference material is characterized by sentence completion units.

If the illustrations were to be used as Master Reference Cards, the words on cards 14a, 14b would be on a single card and similarly the words and articles on 15a, 15b; 16a, 16b; 17a, 17b would appear on a single card. Similarly the picture of the "banana" and the word "banana" would appear on a single card (FIG. 2) as would "difficult" and "complicated" (FIG. 1) and "benutz" and "use" (FIG. 3) and "Can you _____ him?" and "trust" (FIG. 4).

Similarly a Master Reference Chart would use the titles in the elements designated 10, 11, 12 and 13 and the words appearing on elements 14a, 14b; 14c, 14d; 14e, 14f; would appear in close proximity to one another on titled chart 10 to indicate a proper pairing. The same would be true for articles 15a, 15b, 15c, 15d and 15f appearing on titled chart 11; 16a, 16b, 16c, 16d, 16e and 16f on titled chart 12; and 17a, 17b, 17c, 17d, 17e and 17f appearing on titled chart 13.

Figures 1, 2:
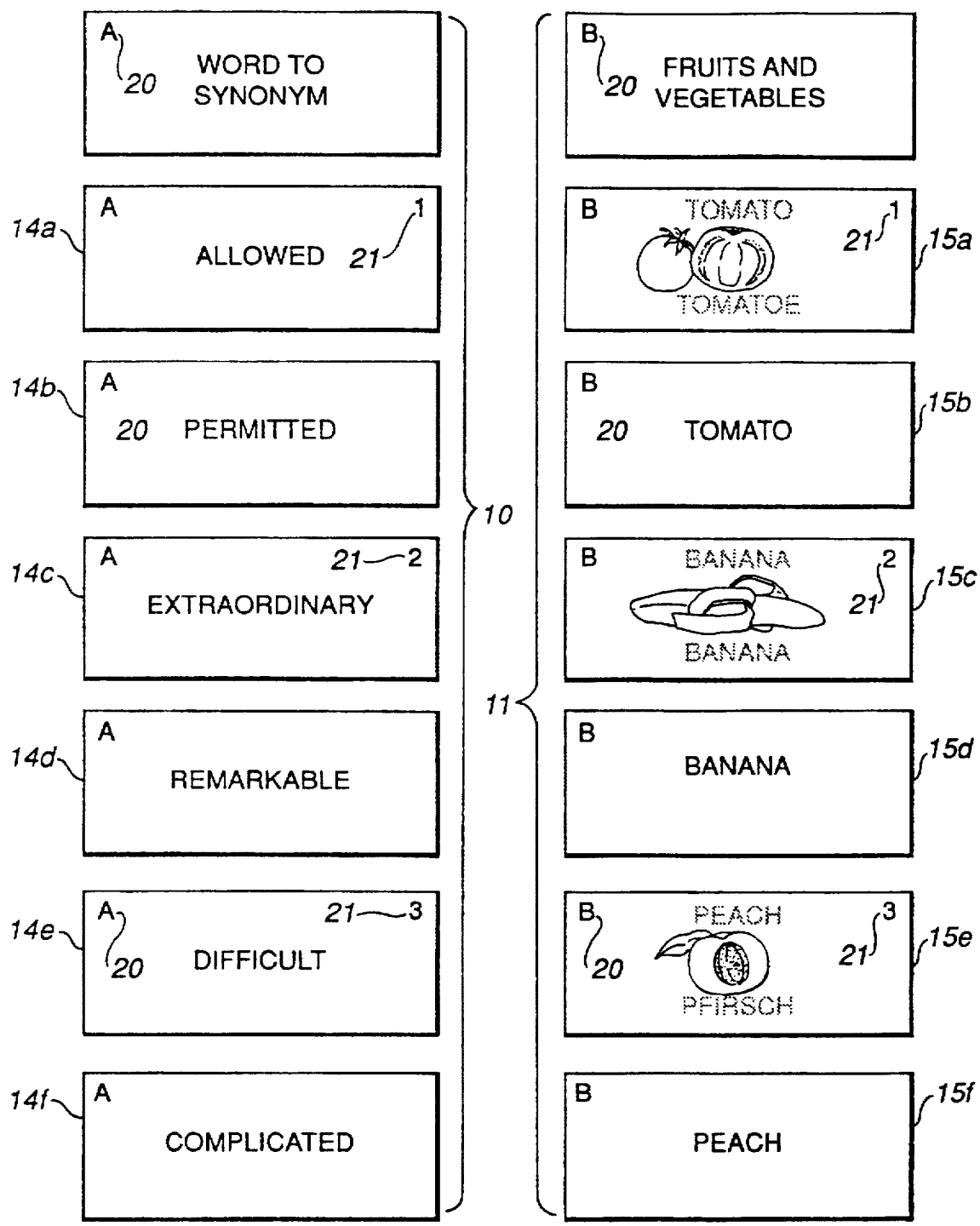
FIG. 1 is an illustration applicable to either a chart form of correlated master reference material or a card form of master reference material wherein a selected category is synonyms.
FIG. 2 is an illustration similar to FIG. 1 wherein the reference material depicts fruits and vegetables or edibles.

Similarly, a primary to secondary language usage is illustrated in FIG. 2. As shown therein, an article is pictured and the English and German words (in dotted letters) naming such article are shown above and below the article.

It should be obvious that all words necessary to teach a primary language to illiterates or beginning readers cannot be illustrated in the drawings required for patent and similarly all the words necessary to teach a secondary language when a primary language is known cannot be shown but applicant believes these drawings and description will allow someone skilled in the art to use the method provided for proper instruction.

In use, after studying the Master Reference Chart or the Master Reference Cards, the student is able to employ the use and testing cards. The cards are described and discussed hereinafter using the same and additional designating numbers as previously utilized.

In these instances, a title card 10, 11, 12 13 is provided with a category indicia such as the letters A, B, C and D and each separate card within this category contains the same indicia, such indicia being shown on only certain cards 20. The query card, in the illustration, cards 14a, 14c and 14e; 15a, 15c and 15e; 16a, 16c and 16e; 17a, 17c and 17c is provided with, as illustrated, a single word, a sentence completion situation or an article as well as a sequential marking 21.

It should also be explained at this point that the use and testing cards obviously include two sides and cards 14a, 15a, 16a, 17a are designated as starting cards and have printing on one side only while the remaining cards in a category are printed on both sides such that sides 14b and 14c form one card, 14d and 14e another card and 14f would be provided with another side that would show a new word and on and on ad infinitum. Similarly 15b and 15c form a card and 15d and 15e another card with 15f and another side forming another card and continuing thereafter. This is true with categories under FIGS. 3 and 4.

In use and testing the card with sequential marking "1", cards 14a, 15a, 16a, 17a, is placed face up on a surface and the remaining cards are placed on this surface in random fashion with only the side having the category indicia and word, word phrase, sentence completion or article being shown. The student now selects what he or she thinks is the appropriate word, phrase, fill in the blanks, name of the article, answer card, to match and agree with the "1" card. He or she then places the selected card directly on top of the "1" card in inverse fashion such that the selected word directly faces the word, etc. of the "1" card. This inversion will expose a new query word and also will expose the sequential marking and if the numerical sequence is correct with the "1" card the student has selected the proper card. The student will continue trying to select the proper corresponding word, sentence completion word, synonym or article name from the remaining answer cards and with each success, the numerical sequence will continue and a new query will be exposed.

Should the student find he or she is making an excessive amount of errors, they can refer back to the Master Reference Chart or Master Reference Cards Again, obviously, the number of such use and testing cards is only governed by the words which are thought to be sufficient for the student to become proficient in the language. Also the categories are unlimited and may include parts of speech such as nouns, pronouns verbs, adjectives and the like. In either situation the method is identical by providing a Master Reference Chart or Master Reference Cards which assimilate the word in close physical association to one another with the use and testing cards providing a query side with the category indicia and sequential marking thereon and the answer side having only the answer and category thereon.

When considering a primary to secondary language learning, the Master Reference Chart and Master Reference Cards are modified to have both the primary and secondary languages thereon and, in case of an article, the primary word, words or phrase is positioned above the article and the secondary therebelow. After studying the Master Chart or Cards, the use and testing cards are utilized and again these cards will only show the primary word, words, phrase, article or the like on the "1" card and the secondary language sides of the remaining cards will be face up. When selection is made and such card inverted over the first card, new primary word, words, phrase article or the like and the sequential marking will be visible. Again the proper sequence of numerals indicates a proper selection.

The invention includes the method of providing such cards and the specific method of using the same in association with one another with the principal aspect being the provision of the first learning step which is the Master Reference Chart or Master Reference Card.

As stated, applicant's method is applicable to a CD-ROM for use with Computer and VGA monitor and mouse.

In such use, for a primary language instruction, after installation and bringing the program to the VGA, the first screen will show a category selection such as articles, synonyms and sentence completion. Each such category will have a set of sub-categories such as articles including "house", "furniture", "edibles", etc. which will provide a new, now Master Screen illustrating a plurality of articles associated with a house such as a roof, door, window, trim, doorbell, etc., and furniture illustrating a plurality of articles such as a table, chair, desk, etc. and each article will be accompanied by the primary language name therefore.

After the student studies and feels competent with his or her knowledge of the articles and their names as shown on such Master Screen, they will click on a test button which will advance the screen to a view showing one such article and a plurality names of articles. When the student selects one of the names, they will click on the same and if correct, an audible, correct signal will be given and the name will change to a picture of a new article. An incorrect choice is indicated by a different audible signal. The student then makes a new word selection and continues until all words have been changed to pictures. Again, reversion may be made at any time to the Master Screen.

A more difficult use and testing scheme may be embodied into the CD-ROM by including a screen which begins with one illustrated article and the student is required to type in the name of the article in one of a plurality of empty boxes. When the right word or article name is typed, a correct audible signal is given and a new article displaces the typed word. This continues until the entire screen is filled with properly named articles. Again, reversion may be made at any time to the Master Screen.

When using primary to secondary language instruction both a primary and secondary word, words, phrase, article, etc. are shown the Master Screen and when an article is so shown, the primary word will appear above the article with the secondary word appearing below the article.

These two methods are identical in their operation as there is exposure of a first query, a selection from a plurality of possible answers, a covering of the query word, words, etc. and the exposure of a new query.

The method then includes the providing of a plurality of individual instructional devices all of which are correlative and operate together in a manner to allow for self testing, correctness and learning assurance.

What I claim is:

1. A method of language instruction and fact recognition including the steps of:

a) providing a master reference chart which includes a plurality of words and synonyms, pictures of articles and a word naming the article, sentence portions and a completion word or words to complete the same, each of such word and synonym, article and naming word, sentence portion and completion word or words all being closely associated to one another on said chart to establish clear relationship therebetween;

b) providing a set of use and testing cards each having two sides;

c) applying a word, sentence portion, article picture singularly to one side of a first of said cards and providing a first sequential marking to said one side of said first of said cards providing a query card;

d) applying respectively, a synonym, completion word or words, and article name to a first side of the remainder of said cards and applying a word, sentence completion word or words, a picture of an article and a sequential marking respectively on the obverse side of the remainder of said cards to provide a combined answer and a new query side to said remainder of such cards;

e) arranging said query, first of said cards on a surface exposing said word, sentence portion, article picture and sequential markings in visible positon;

f) arranging said remainder of said cards on a surface exposing said synonym, sentence completion word or words, and article names as possible answers to said query, first card whereby a student may select from said possible answers, invert the same against said first card to expose said obverse, new query side, and compare the sequential markings of said first card to the inverted card to determine sequential properness of said sequential markings and therefore determine selection correctness; and, g) directing the student to continue to select from the remainder of such cards through the plurality thereof.

2. The method of language instruction and fact recognition as set forth in claim 1 wherein each of said cards including said first card and said remainder of said cards are provided with a common category indicia.

3. The method of language instruction and fact recognition as set forth in claim 1 wherein said master reference chart includes:

a) words in a first primary language, synonyms in a secondary or new language to be learned, sentence portions in a first primary language and completion word or words in said secondary language and pictures of articles and names therefore in a primary language are provided with said primary and secondary language words arranged in close association with one another to establish clear relationship therebetween.

4. A method of language instruction and fact recognition including the steps of:

a) providing a set of master reference cards each of which includes a selected one of words and synonyms, picture of an article and name therefore, sentence portion and a completion word or words;

b) providing a set of use and testing cards each having two sides;

c) applying a word, article name, sentence completion portion, singularly to one side of a first of said use and testing cards and providing a first sequential marking to said one side of said first of said use and testing cards providing a query card;

d) applying respectively, a synonym, article name, sentence completion word or words, to a first side of the remainder of said use and testing cards as answer cards and applying a word, sentence portion, picture of an article and a sequential marking on the obverse side of the remainder of said use and testing cards as new query cards whereby a combined answer and new query side is provided on the remainder of said use and testing cards;

e) arranging said query, first of said cards on a surface to expose said word, sentence portion, article picture and sequential marking in visible position;

g) arranging the remainder of said cards on a surface to expose said synonyms, sentence completion words or words, and article names as answer cards to said query card, whereby a student may select from said possible answer cards whereby and select therefrom, invert the same against said first query card to expose said obverse, new query side and compare the sequential markings of said first card to the inverted card to determine sequential properness and selection correctness; and, h) directing the student to continue the selection of answer cards in the same manner through the remainder of such answer and query cards.

5. The method of language instruction and fact recognition as set forth in claim 4 wherein each of said cards including said first card and said remainer of said cards are provided with a common category indicia.

6. The method of language instruction and fact recognition as set forth in claim 4 wherein said master reference cards include:

a) words in a first primary language, synonyms in a secondary or new language to be learned, sentence portions in a first primary language and completion words in said secondary language and pictures of articles and names therefore in a primary and secondary language words arranged adjacent said article whereby close assiciation between said primary and secondary languge is achieved.

\* \* \* \* \*